April 17, 1928.

F. DECKEL ET AL 1,666,557

CAMERA SHUTTER

Filed March 16, 1925    2 Sheets-Sheet 1

Inventors
Friedrich Deckel
Martin Geiger
By Frederick S. Church
their Attorney

April 17, 1928.
F. DECKEL ET AL
1,666,557
CAMERA SHUTTER
Filed March 16, 1925
2 Sheets-Sheet 2
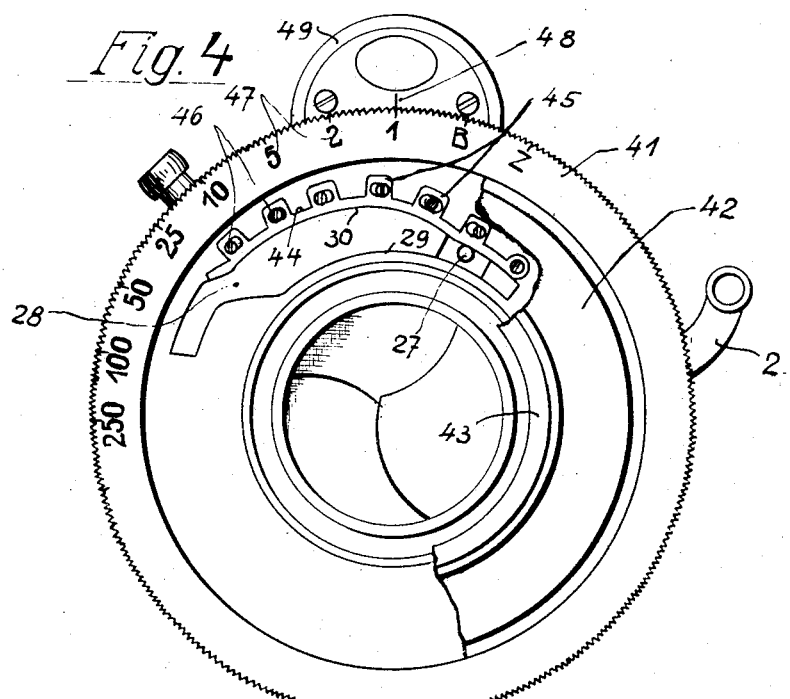
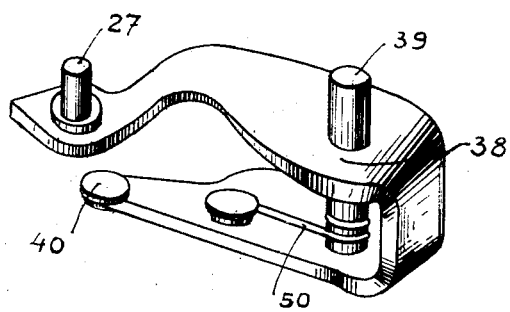
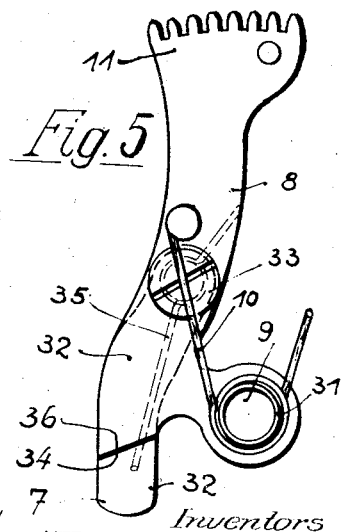
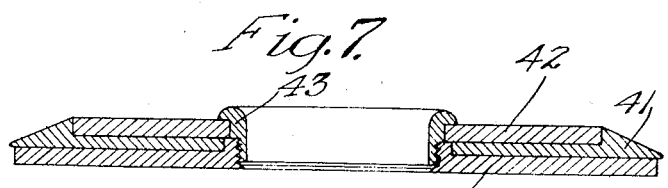
Inventors
Friedrich Deckel
Martin Geiger
By
their Attorney Patented Apr. 17, 1928.

1,666,557

UNITED STATES PATENT OFFICE.

FRIEDRICH DECKEL AND MARTIN GEIGER, OF MUNICH, GERMANY, ASSIGNORS TO THE FIRM: FRIEDRICH DECKEL, PRÄZISIONSMECHANIK UND MASCHINENBAU, OF MUNICH, BAVARIA, GERMANY.

CAMERA SHUTTER.

Application filed March 16, 1925, Serial No. 15,722, and in Germany April 9, 1924.

The present invention relates to camera shutters and has for its object to provide means for regulating the exposure time of such shutters in a very simple yet extremely accurate and sensitive manner without step or break over a very extended range of adjustment.

Another important object of the invention is to provide means for adjusting the exposure controlling means readily in order to have the actual exposures correspond exactly with the values on the scale provided on the shutter.

To accomplish the objects of this our invention a principal and an auxiliary retarding device have been provided which may be regulated independently and applied in any number of different combinations.

The auxiliary retardation may be effected by having the principal retarding device perform oscillating movements and an adjustable curve is provided to facilitate an accurate and quick setting of the instrument which previously had to be accomplished by filing and stretching the edge of the curve.

In order that this our invention may be more readily understood reference is made to the accompanying drawings which show how this invention may be carried into practical effect. All parts of the shutter not standing in direct relation to the object of the invention have not been shown but may be of well known construction.

Fig. 4 is a top view of the shutter corresponding to the setting shown in Figure 1 with the cover plate removed.

Figs. 5 and 6 show details.

Fig. 7 is a cross section taken centrally through the cover plate, setting disk and top plate.

Figure 1:
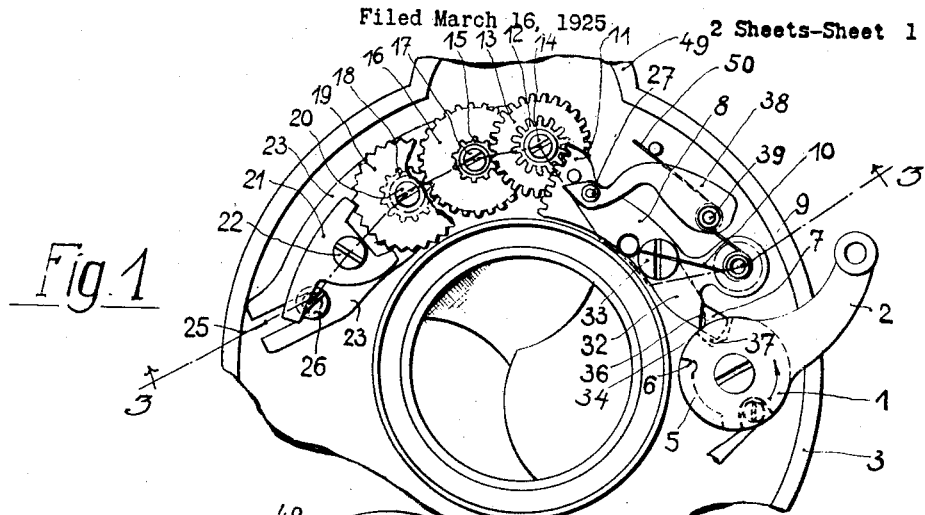
Fig. 1 shows the internal arrangement of the retarding mechanism, set for the longest exposure, the plate carrying the exposure controlling means and the cover plate being removed.

The spring motor or master member 1 that furnishes the power for operating the shutter is wound by a setting lever 2 and is located in the annular recess of the shutter housing 3 which is closed by the cover 4. The arrow on Figure 1 indicates the direction of movement of the master member when tripped. A retarding lever 8 is mounted on a pivot stud 9, a bushing 31 fastened in the lever 8 providing a substantial bearing. On the retarding lever 8 there is mounted a lever 32 on a stud screw 33 (see Figure 5). This lever 32 is formed with a shoulder 34 which is held by a spring 35 against a corresponding shoulder 36 of the lever 8. A spring 10 tends to swing the retarding lever 8 in counter clockwise direction forcing thus the end 7 of the lever 32 into a recess 37 provided in the housing of the master member 1. When depressing the lever 2 for winding the spring motor 1 the lever 32 is swung out of the way by a projecting portion of the housing of the motor 1 until a second recess 5 has been turned around so far that the end 7 of the lever 32 can move into its normal position under influence of the spring 35.

The lever 8 is formed on the end 11 with gear teeth which stand in engagement with a gear 12. Another gear 13 is fastened to the gear 12; both turn together on a pivot stud 14. A further pair of gears 15 and 16 turning on a pivot 17 transmit the turning movement to a gear 18 which is fastened to an anchor wheel 19; both turn together on a stud 20. An anchor 21 turning on a pivot 22 stands in engagement with the wheel 19. The pivot studs 14, 17, 20 and 22 are fastened in a plate 23, which is pivotally connected on the axis 14 to a link 24. The other end of this link 24 turns on the pivot stud 9. The plate 23 is guided on the opposite end by a screw 26 entering into a slot 25 of the plate. When rocking the lever 8, therefore, there is the possibility of two distinct movements. In the one case the plate 23 carrying the main retarding mechanism is taken along without any movements in the gear wheels, effecting thus a comparatively small auxiliary retardation. In the second case the plate 23 is prevented from moving and the rocking of the lever 8 causes a corresponding rotation of the train of gears. In order to combine these two distinct movements in all possible variations a pin 27 is mounted on a lever 38 (see Figure 6). This lever has two arms one above and the other below the lever 8 and is pivoted on a stud 39 and is influenced by a spring 50 in counter clockwise direction. The pin 27 is fastened on the upper arm, while a button 40 is located on the lower arm, which button fits into a slot of the link 24. In this manner the pin 27 is moving in correspondence with the link 24. On the cover plate 4 there is mounted turnably a setting disc 41 of slightly larger diameter than the cover and housing and serrated on the circumference so that it may be adjusted readily by hand for the different durations of exposure. A top plate 42 is held by a nut 43 in place and holds in turn the setting disc to the cover 4. The pin 27 protrudes through an opening in the cover 5 to extend into a slot 28 in the setting disc 41 whereof the two sides 29 and 30 are of curved shape so as to govern the movement of the pin 27 and of the link 24 and the plate 23 in the various combinations. Instead of a fixed curve 30 there has been provided an adjustable curve consisting of a narrow band 44 with a number of eyes 45 and studs 46 with excentric heads fitting into the slots in the eyes 45. When turning these studs 46 the band 44 being sufficiently elastic assumes a trifle different shape and thus the curve can be adjusted so that the time of exposure agrees exactly with the scale 47 on the sloping face of the setting disc 41. The scale registers with a mark 48 on a protruding portion 49 of the cover 4 which is provided on the cover and the housing 3 to permit the swinging movement of the retarding gear plate.

The action of the mechanism is as follows:

When setting the master member 1 by depressing the lever 2 the lever 32 is swung back first and thereupon enters with the end 7 into the recess 5 of the housing of the master member. The depth to which the end 7 enters into the recess is determined by the shape of the curve 29. When releasing the master member 1 the lever 8 remains stationary until the shoulder 6 of the recess 5 strikes against the end 7. The moment of contact should be chosen at the time when the blades of the shutter, which are actuated by a connecting rod from the motor member 1 in well known manner, have been opened the furthest, in order that the lever 8 with the train of gearing may interpose at this period the retardation of varying magnitude. After the nose 7 has been pushed out of the recess 5 the motor member is free to move and the closing of the shutter blades is quickly accomplished.

Figure 2:
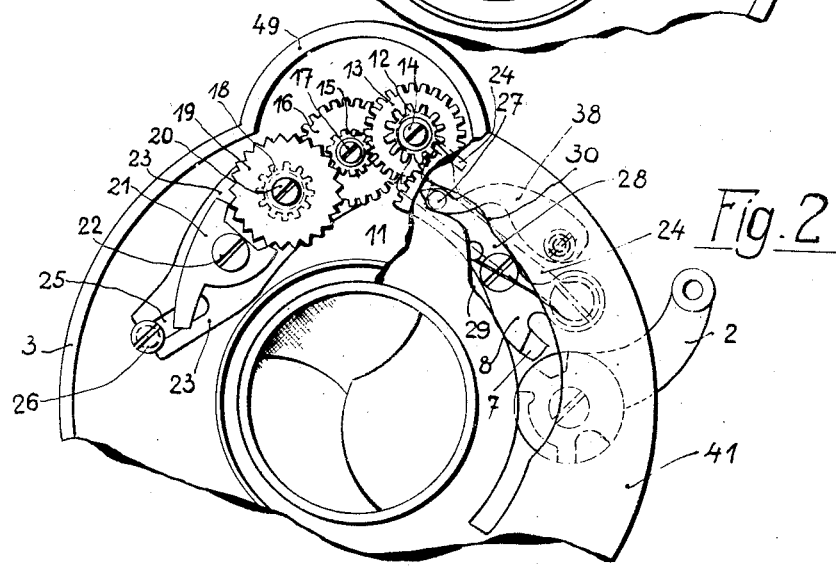
Fig. 2 shows the internal arrangement as in Figure 1 but set for the shortest possible exposure.
Figure 3:
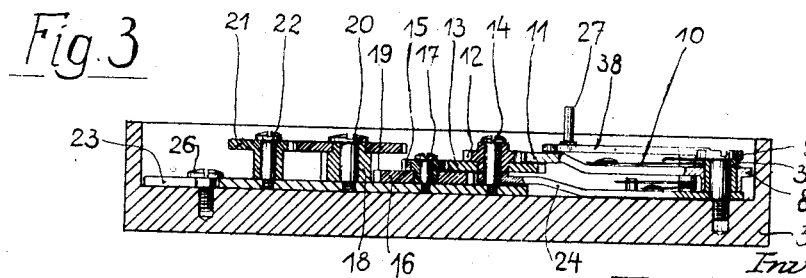
Fig. 3 is a section through the internal arrangement taken approximately on the line 3—3 of Fig. 1.

The movement of the lever 32, with respect to the lever 8, causes a pressure against the teeth of the gear 12 which results either in a turning movement of the gear or the latter is taken along bodily. As the swinging movement offers the least resistance the train of gearing on the plate 23 is taken along with the axis 14 describing an arc around the center 9 on account of the connection of the link 24, while the other end of the plate 23 is sliding under the screw 26. This movement continues until the pin 27 lays up against the curve 30. Any further movement required is obtained through running down the train of gearing with the anchor wheel and anchor at the end providing a heavy retardation. The various combinations of these two partial retardations enable a setting for all durations of exposure without step or break over a very extended range. Only the curves 29 and 30 have to be formed accordingly, whereby the curve 29 regulates the depth to which the end 7 may enter into the recess 5, while the curve 30 limits the swinging movement of the plate 23. In the one extreme position of the setting disc 41 the end 7 enters furthest into the recess 5 and a swinging of the plate 23 cannot take place resulting in the longest possible exposure. In the other extreme position as shown in Figure 2 the lever 8 has been turned so far that the end 7 cannot be touched by the shoulder 6 and the motor member 1 can close the shutters without any retardation causing the shortest exposure possible.

Having now fully explained our invention we do not wish to be understood as limiting ourselves to the exact details of construction as obviously many modifications will occur to a person skilled in the art.

What we claim is:

1. In a photographic shutter the combination with a blade mechanism, and a motor member for operating the same, of a support, and a retarding device mounted to move bodily and also rotatably on said support and also driven by the motor member.

2. In a photographic shutter the combination with a blade mechanism, and a motor member for operating the same, of a support, a retarding device embodying a gear train mounted on said support and an actuator for driving the gear train from the motor member, said gear train support being adapted to also yield bodily under impulses from the actuator.

3. In a photographic shutter the combination with a blade mechanism, and a motor member for operating the same, of a retarding device embodying a gear train, actuating means for driving the gear train from the master member, and a carrying device for the gear train adapted to move the latter to different points of engagement in the path of the actuator.

4. In a photographic shutter the combination with a blade mechanism, and a motor member for operating the same, of a retarding device embodying a gear train, an actuating segment for driving the gear train from the motor member, and a swinging lever carrying the gear train and adapted to move it to different positions in the path of the actuating segment.

5. In a photographic shutter the combination with a blade mechanism, and a motor member for operating the same, of a retarding device embodying a gear train, an actuating segment for the latter driven by the motor member, a carrying plate for the gear train slidably mounted at one end, and a regulating device pivoted to the other end and turning concentrically with the actuating segment to move the gear train to different positions in the path thereof.

6. In a photographic shutter the combination with a blade mechanism, and a motor member for operating the same, of a retarding device embodying a gear train, a segment actuator for driving the gear train from the motor member, means for moving the gear train bodily to different positions in the path of the actuating segment, and a regulating device controlling said movements and also controlling the position of the actuator in the path of the motor member to vary the limits of the throw of said actuator.

7. In a photographic shutter the combination with a blade mechanism, an adjustable retarding device, and a motor member for driving both, of a regulating device embodying a setting member having a cam slot therein, cooperating with an element of the retarding device, the wall of said slot embodying a flexible element and eccentric screws cooperating therewith for effecting its adjustments to different curvatures.

8. In a photographic shutter the combination with a shutter mechanism and a motor member for operating said shutter mechanism of a retarding device embodying a train of gearing, a plate for carrying said train of gearing, a link connected to one end of said plate and a sliding joint at the other end of said plate for permitting the latter and said train of gearing to perform a joint sliding and pivotal movement.

9. In a photographic shutter, the combination with a shutter mechanism and a motor member for operating said shutter mechanism of a toothed lever actuated by said motor member, a train of gearing in engagement with said toothed lever, and a movable plate for carrying said train of gearing permitting the train of gearing to move bodily with said toothed lever.

10. In a photographic shutter, the combination with a shutter mechanism and a motor member for operating said shutter mechanism of a toothed lever actuated by said motor member, a gear retarding device in engagement with said toothed lever, a movable carrying means for said gear retarding device permitting it to move with said toothed lever, and means for regulating this movement of said gear retarding device and its carrying means with said toothed lever.

11. In a photographic shutter, the combination with a shutter mechanism and a motor member for operating said shutter mechanism of a retarding device for controlling the movement of said motor member when running down, a curved stop for controlling the retarding device and means for varying slightly the curvature of said stop.

12. In a photographic shutter, the combination with a shutter mechanism and a motor member for operating said shutter mechanism of a retarding device, a pin mounted thereon, an adjustable curved stop for cooperating with the pin to control the retarding device, and excentric studs for varying the curvature of said stop.

13. In a photographic shutter, the combination with a shutter mechanism and a motor member for operating said shutter mechanism of a retarding device, a curved stop for controlling said retarding device and a plurality of excentric studs for varying the curvature of said stop.

14. In a photographic shutter, the combination with a shutter mechanism and a motor member for operating said shutter mechanism of toothed lever actuated by said motor member, a gear retarding device in engagement with said toothed lever, a link connection for moving said gear retarding device bodily with said toothed lever, a curved stop for controlling the movement of said link connection, and means for varying the curvature of said stop.

15. In a photographic shutter, the combination with a blade mechanism, of means for actuating said blade mechanism, and a cam for controlling said actuating means, said cam being flexible so that it may be intentionally deformed to produce slight variations in the controlling action of said cam but being sufficiently strong to withstand ordinary use.

In testimony whereof we hereunto affix our signatures.

FRIEDRICH DECKEL.
MARTIN GEIGER.